United States Patent Office 3,325,457
Patented June 13, 1967

3,325,457
METHOD OF PREPARING ACRYLONITRILE POLYMERS
Arnold B. Finestone, Leominster, and James S. Pavlin, Fitchburg, Mass., assignors to Foster Grant Co., Inc., a corporation of Delaware
No Drawing. Continuation of application Ser. No. 107,311, May 3, 1961. This application Aug. 26, 1965, Ser. No. 482,919
9 Claims. (Cl. 260—80.5)

This application is a continuation of application Ser. No. 107,311 filed May 3, 1961, and now abandoned.

This invention relates generally to an improved technique for preparing polymeric materials. More specifically, this invention relates to an improved method of obtaining uniform copolymers of vinyl aryl compounds with acrylonitrile employing suspension polymerization techniques.

Thermoplastic resinous compositions of from about 65% to 80% by weight of vinyl aryl compounds and 35% to 20% by weight of acrylonitrile are known. These polymers have average molecular weights such that 19% by weight solutions of the polymers in methyl ethyl ketone have viscosities between 6 and 40, preferably between 9 and 30, centipoises at a temperature of 25° C. The polymers usually possess the most desirable combination of mechanical properties, viz., strength, hardness, flexibility and molding behavior, viz., flow rate, which combination of mechanical properties and molding behavior is related to the average molecular weight of the copolymers.

These polymeric compositions are known as "solvent-resistant" resins, viz., resins that are relatively resistant to attack by such liquids as gasoline, alcohol, water, aqueous acids and aqueous bases, even though they are swellable and/or dispersible in such liquids as methyl ethyl ketone. As molding compositions they are readily moldable to clear and substantially non-discolored products by conventional means such as by compression or injection molding, hot pressing, extrusion or the like.

Several methods of preparing such thermoplastic resinous compositions are known to the art. For example, bulk, solution, suspension and emulsion polymerization methods have been employed.

However, it is difficult to prepare consistently uniform polymeric products in the foregoing proportions which are readily moldable to clear, uniform and non-discolored products which have satisfactory mechanical and molding behavior. The reasons, therefore, are quite evident. That the copolymerization reaction, in which copolymers in the foregoing proportions are formed, is vigorously exothermic is well known as are the facts that the rate of polymerization increases with an increase in reaction temperature and that the average molecular weight of the copolymer product usually decreases with such increase in reaction temperature. At temperatures at which the copolymerization is readily controlled, the rate of production of the copolymer is undesirably slow and the molecular weight of the copolymer is undesirably high. On the other hand, polymerization at temperatures calculated to give desirable average molecular weight results in a reaction rate so great as to make its control difficult.

In general therefore, raising the temperature at which suspension polymerization is carried out for the purpose of lowering the molecular weight of the product is usually undesirable since it involves a considerable increase in the rate of reaction and may result in either or both an uncontrollably strong exothermic or "runaway" polymer reaction and discoloration of the polymeric product by overheating.

It is further known that the higher the percentage of conversion of the initial monomers employed in the polymerization, the greater the tendency towards production of non-uniform, high viscosity and high molecular weight products. Non-uniformity of the resultant product is due to the nature of the copolymerization reactions. Thus when one of the monomers in the reaction mixture tends to polymerize at a faster rate than other monomer or monomers in the mixture, the copolymer produced during the early stages of polymerization will contain a higher mixture of the said monomer than is present in the polymerization mixture. As polymerization is carried on to high degrees the percentage of the more rapidly polymerizing monomer remaining in the polymerization mixture will fall, since it is being used up more rapidly during the polymerization. Consequently, the composition of the polymer produced from this mixture will also change. When a monomer mixture of styrene, alpha-methylstyrene and acrylonitrile monomer is polymerized, each monomer will enter the polymer formed at a different rate. After the mixture reaches the conversion of approximately 40% further polymerization will yield a polymeric product having polymer chains of varying compositions. However, up to about 70% conversion, the small degree of non-uniformity in the composition of the polymer chains formed will not seriously affect the physical and chemical properties of the polymer produced. At higher conversions, an undesirable high molecular weight, non-uniform polymer results. The above discussed problems of high viscosity, high molecular weight and non-uniformity are problems encountered in copolymerization reactions, wherein one monomer will polymerize at a different rate than another monomer.

This problem has been recognized by the prior art. Heretofore, it has been proposed to regulate the rate of addition of one or more of the monomers in emulsion or bulk methods in order to control the rate of polymerization and composition of the final polymeric product. Such regulation, however, is difficult to perform, and requires elaborate timing, temperature and flow controls.

Admittedly, distillation or stripping of emulsion or suspension polymeric systems are well known in the art as described in U.S. Patent 2,822,356. However, this procedure has previously been employed chiefly for removal of unreacted monomer from the polymerization vessel after the completion of polymerization.

We now have found a method of obtaining uniform, polymeric materials comprising removal of monomer during suspension polymerization of comonomers such as a vinyl aryl compound and acrylonitrile in order to control the monomer ratio in the reaction mixture. More specifically, we now have found that we can employ a steam stripping or steam distillation procedure, utilizing heat and/or low pressure, to control the distillation of one or more monomers from a suspension polymerization system during polymerization. By controlling the monomer ratio within predetermined limits during suspension polymerization, the composition of the polymeric chains formed may be controlled and low molecular weight, low viscosity uniform polymers can be produced.

Additionally, we have found that the monomer stripping technique can be advantageously improved by adjusting the pH of the reaction mixture to a predetermined value before polymerization. Proper control of the pH value of the reaction mixture, surprisingly, reduces the foam normally produced and enables unhampered monomer removal by stripping procedures. Proper control of foam during polymerization of this type has, heretofore, been a perplexing problem in itself.

The procedures of our invention are particularly advantageous when polymerizing vinyl aryl compounds with acrylonitrile by suspension techniques and in particular provides advantages to suspension polymerization of mixtures such as, styrene with or without alpha-methylstyrene and acrylonitrile employing any of the catalysts well known to the art. Thus catalysts such as benzoyl peroxide, p-chlorobenzoyl peroxide, t-butyl perbutyrate, t-butyl perbenzoate, cumyl peroxide, etc., may be employed.

Examples of useful catalysts include water insoluble aliphatic peroxide catalysts having the general formula:

$$CH_3(CH_2)_nCO_2O_2$$

wherein $n$ is an integer greater than two, preferably an integer from 6 to 16, i.e., caprylyl, octanoyl, lauroyl, myristyl and stearyl peroxides.

Styrene-acrylonitrile polymers prepared in the presence of the aforementioned water insoluble aliphatic peroxide catalysts and a monovinyl compound such as alphamethylstyrene have relatively good color, do not appreciably discolor and are readily moldable to substantially clear and non-discolored shaped products by conventional means, as more fully disclosed and claimed in our co-pending U.S. application Ser. No. 21,146 filed April 11, 1960 and now abandoned.

Desirable polymeric compositions consisting essentially of from about 65% to 80% by weight of at least one vinyl aryl compound and from about 35% to about 20% by weight of acrylonitrile can be produced by suspension polymerization in the presence of a catalyst of the aforementioned type. We prefer to employ systems comprising about 65 to 80% by weight of styrene and about 35 to 20% by weight of acrylonitrile or about 30 to 75% by weight of styrene, about 35 to 5% by weight alpha-methyl-styrene and about 35 to 20% by weight of acrylonitrile. The quantity of alpha-methyl-styrene normally employed may be lowered or in some cases eliminated by incorporation in the system of a chain transfer agent, i.e., mercaptans, aliphatic halogenated compounds, aromatic hydrocarbons, unsaturated dimers of monomeric alpha-alkyl aromatic compounds such as dimer of alpha-methylstyrene, etc.

Inorganic suspending agents are most advantageously employed in the process of our invention. Examples include talc, phosphates of the type noted in U.S. Patents 2,687,408; 2,673,194; 2,715,118; 2,594,913, etc. A preferred suspending agent is calcium hydroxyapatite precipitated by reaction between the required amounts of trisodium phosphate and calcium chloride.

When polymerizing styrene and acrylonitrile or styrene, alpha-methylstyrene and acrylonitrile in aqueous suspension, polymerization may be carried out at about 70° C. to 130° C., preferably 73° C. to 120° C. for about one to ten hours, preferably one to six hours or until approximately 40 to 70% conversion is achieved. For those reactions maintained at or about 77° C. a positive pressure is required to prevent premature distillation of the system. At this point, the temperature of the reaction may be raised incrementally up to a maximum of 145° C. depending upon the pressure employed. A maximum of eight hours is preferably employed during the increased temperature or distillation step. In those systems in which increased pressure is not employed, the temperature is increased to a maximum of 100° C. The rate of temperature increase or partial decrease of pressure in a pressure system are expedients enabling control of the rate of removal of the various monomers. In this manner, the requisite monomer ratio in the suspension system is maintained during polymerization. Preferably the temperature increase during the steam distillation step is carried out in equal incremental stages over the period required for completion of the polymerization.

When the temperature of the reaction is raised about approximately 77° C. in the normal suspension system employed in our invention, a foam is formed probably due to soap formation as a result of the interaction of the inorganic suspending-agent and contaminants present in the organic peroxide catalysts employed. This appears on the surface of the reaction mixture and tends to prevent or hamper monomer removal or steam stripping. However, if the pH of the aqueous suspending media alone is adjusted so that it lies within the range of pH 2.5 to 4.5 and preferably 2.5 to 3.5, before addition of the monomers and suspending agent, it will be found that the amount of foam formed at the surface of the reaction mixture will be greatly reduced. The pH may be adjusted after the addition of the monomers and suspending agent by adding a quantity of acid to the reaction mixture which would be sufficient to adjust the suspending media to a pH of 2.5 to 4.5 and preferably 2.5 to 3.5 if the monomers and suspending agent were not present. By reducing the degree of foaming, monomer removal at faster rates is enabled without attendant clogging of the reaction distillation apparatus and siphoning off of the reaction mixture. In consequence, as monomers are easily removed from the polymerization system, production of more uniform, low molecular weight compositions results.

Organic and inorganic acids may be employed to adjust the pH value to the desired level. We have found that acids having ionization constants less than $10^{-4}$ are most suitable for use in our system since they can be accurately measured, thereby providing reliable and easily controlled pH changes in the monomer mixture without causing suspension instability of the system. It is important that an excess of acid not be employed since in such case, suspension instability may be produced. Examples of desirable acids include acetic, pimelic, citric, adipic, boric, carbonic, formic, glutaric, succinic, phosphoric, acids or mixtures thereof. When stronger acids such as hydrochloric, sulfuric, nitric acid, etc. are employed, extremely small amounts must be used.

The catalyst is selected from those classes described above and are employed in the aqueous suspension in amounts of from about 0.02% to 2.0%, preferably between 0.1 to 1.6% by weight of the combined weight of the monomer charged.

The vinyl aryl compounds which can be used in preparing the copolymers of our invention include those compounds represented by the following formula:

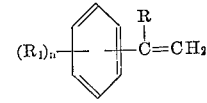

wherein R is selected from the group consisting of hydrogen and methyl radicals, $R_1$ is a substituent selected from the group consisting of chlorine and lower alkyl radicals and $n$ is an integer between 0 and 2. Included are styrene per se, nuclear substituted alkyl styrenes, e.g., o-, m- and p-methyl styrene, 2-4 dimethyl-styrene and the like, alpha and beta alkyl substituted styrenes, e.g., alpha-methylstyrene and the like. Mixtures of vinyl aryl compounds may also be employed, i.e., a mixture of styrene and alpha-methylstyrene as set forth above.

During polymerization, various anti-oxidants, viz 2,6 di-t-butyl 4 cresol, 4,4-thiobis-(2,6 di-t-butylphenol) may be included to purge the system of the last traces of oxygen. Normally this is extremely difficult and the addition of an anti-oxidant of the above type helps overcome this problem.

The following examples are illustrative of our invention but are not to be construed as limiting. In these examples, parts are recited as parts by weight unless otherwise specified and viscosities are measured as relative viscosities of a 10% by weight solution of the compositions in methyl ethyl ketone at 25° C.

EXAMPLE 1

To a suitable pressure reaction vessel containing 100 parts of distilled water are added 52.2 parts of styrene monomer, 15.8 parts of alpha-methylstyrene monomer, 32 parts of acrylonitrile, 1.4 parts of lauroyl peroxide and 0.3 part of 2,6 di-t-butyl p-cresol. The monomer mixture is polymerized at a temperature of 76° C. in an inert atmosphere under autogeneous pressure for 6 hours and 45 minutes. Calcium hydroxyapatite precipitated by a reaction between the required amount of trisodium phosphate and calcium chloride is used as suspending agent. Upon completion of the polymerization the polymer beads formed are thoroughly washed with water and dried in an air drier at 70° C. In the final copolymer there is approximately 28% of combined acrylonitrile by weight of the copolymer. The copolymer so formed has a viscosity of 16.6 centipoises.

EXAMPLE 2

Example 1 is repeated; however after 2 hours, when the reaction mixture has reached an approximate conversion of 60%, a positive nitrogen pressure is applied to prevent distillation of unreacted monomers and the temperature of the reaction mixture is raised in approximately equal increments to 100° C. over a period of 2 hours and 40 minutes.

The copolymer so formed is partially insoluble in methyl ethyl ketone and for this reason, no viscosity could be obtained. In the final copolymer there is 30.5% by weight of combined acrylonitrile.

EXAMPLE 3

Example 1 is repeated; however after 2 hours, when the mixture has reached an approximate conversion of 60%, the temperature of the reaction mixture is raised in approximately equal increments to 100° C. over a period of 2 hours and 40 minutes, allowing monomer vapors to be steam distilled from the reaction mixture. A large quantity of foam is produced at the surface of the reaction mixture. The copolymer so formed has a viscosity of 10.3 centipoises. In the final copolymer there is 26% of combined acrylonitrile by weight of the copolymer.

EXAMPLE 4

Example 3 is repeated with the addition of 0.027 parts of pimelic acid to the reaction vessel. The foaming occurring at the surface of the reaction mixture is reduced in this example as compared to Example 3. The viscosity of the copolymer so formed is 9.1 centipoises. In the final copolymer there is approximately 26% of combined acrylonitrile by weight of the copolymer.

In Examples 5–11 the procedure of Example 4 is followed with the substitution of the acids noted for the pimelic acid of Example 4. Table 1 shows the effect on the suspension stability and foaming of the reaction mixtures. The viscosities of the final compositions produced in these experiments are between 9 and 10 centipoises.

TABLE I

| Ex. | Acid | Moles of Acid per/100 ml. of H$_2$O | pH at 25° C. (after addition of acid but before addition of suspending agent and monomer) | Suspension Stability | Foaming* |
|---|---|---|---|---|---|
| 5 | Phosphoric | 0.00024 | 2.95 | Good | Reduced. |
| 6 | ----do---- | 0.00032 | 2.8 | ----do---- | Do. |
| 7 | Citric | 0.000238 | 3.15 | ----do---- | Do. |
| 8 | ----do---- | 0.000298 | 3.03 | ----do---- | Do. |
| 9 | Pimelic | 0.000174 | 3.8 | ----do---- | Slightly reduced. |
| 10 | ----do---- | 0.000694 | 3.4 | ----do---- | Do. |
| 11 | Glacial Acetic | 0.000464 | 3.0 | ----do---- | Do. |

*As visually compared to foam produced in Example 3.

EXAMPLE 12

Example 2 is repeated however the 15.8 parts of alpha-methylstyrene is replaced by 15.8 parts of styrene monomer and the lauryl peroxide is replaced by 0.93 part of benzoyl peroxide.

The final polymer obtained is partially insoluble in methyl ethyl ketone thus, no viscosity could be obtained. In the final copolymer there is 30.5% by weight of combined acrylonitrile.

EXAMPLE 13

Example 12 is repeated employing the same reaction conditions as in Example 3.

In the final copolymer there is 25.8% by weight of combined acrylonitrile. The copolymer so formed has a viscosity of 12.2 centipoises.

EXAMPLE 14

Example 13 is repeated employing the same concentration of citric acid as employed in Example 8 in the reaction vessel. Foaming is reduced in the polymerization vessel. The viscosity of the final copolymer is 11.5 centipoises.

EXAMPLE 15

To a suitable reaction vessel containing 100 parts of distilled water are added 52.2 parts of styrene monomer, 15.8 parts of alpha-methylstyrene monomer, 32 parts of acrylonitrile, 0.9 part of capryl peroxide and 0.3 part of a conventional anti-oxidant. Calcium hydroxyapatite precipitated by a reaction between the required amount of trisodium phosphate and calcium chloride is used as suspending agent. The monomer mixture is polymerized at a temperature of 76° C. for one hour and 25 minutes at which time a positive nitrogen pressure is applied to prevent distillation of unreacted monomer and the temperature is increased to 100° C. in substantially equal increments over a period of 3 hours. Upon completion of the polymerization the polymer beads formed are thoroughly washed with water and dried in an air drier at 70° C.

In the final copolymer there is approximately 29.5% by weight of combined acrylonitrile. The final copolymer is partially insoluble in methyl ethyl ketone and thus, no viscosity could be obtained.

EXAMPLE 16

Example 15 is repeated, however, after 1 hour and 25 minutes when the monomer mixture has reached a conversion of approximately 40% and when the temperature is raised the nitrogen pressure is substantially removed and unreacted monomers are allowed to steam distill from the reaction mixture.

The final copolymer has a viscosity of 12.7 centipoises.

EXAMPLE 17

Example 16 is repeated employing the same concentration of pimelic acid as employed in Example 10 in the reaction vessel. Foaming is reduced in the polymerization vessel. The viscosity of the final copolymer is 11.4 centipoises.

EXAMPLE 18

To a suitable pressure reaction vessel containing 100 parts of distilled water are added 65 parts of styrene monomer, 30 parts of acrylonitrile monomer, 5 parts of alpha-methylstyrene, 0.6 part of di-t-butyl peroxide and 0.3 part of a conventional antioxidant. The reaction mixture is polymerized at a temperature of 118° C. for 6 hours.

A positive nitrogen pressure is applied to the reaction vessel preventing monomer distillation during the polymerization. Calcium hydroxyapatite precipitated by a reaction between the required amount of trisodium phosphate and calcium chloride is used as suspending agent. Upon completion of the polymerization the polymer beads formed are thoroughly washed with water and dried in an air drier at 70° C.

The final copolymer is partially insoluble in methyl ethyl ketone and thus no viscosity could be obtained.

EXAMPLE 19

Example 18 is repeated, however, after 1 hour and 50 minutes the temperature is raised to 130° C. in approximately equal increments for 4 hours and 10 minutes and monomers are steam stripped against the positive nitrogen pressure. Care must be taken in the rate of increasing the temperature as a rapid increase causes excess foaming and a tendency of the reaction mixture to be siphoned out of the reaction vessel.

The final copolymer has a viscosity of 14.8 centipoises.

EXAMPLE 20

Example 18 is repeated employing the same concentration of citric acid employed in Example 7. The temperature is increased to 130° C. over a period of 3 hours in this experiment since no problem of foaming occurs herein.

The viscosity of the final copolymer is 13.9 centipoises.

EXAMPLE 21

Example 20 is repeated, however, initial polymerization is carried out employing 0.9 part of di-t-butyl peroxide at a temperature of 110° C. for 5 hours. Monomer removal is carried out by raising the temperature to 130° C. in equal increments over a period of 3 hours and 30 minutes.

The viscosity of the final copolymer is 17.2 centipoises.

EXAMPLE 22

Example 2 is repeated, however, after the 4 hours and 40 minute polymerization time when polymerization is substantially complete the nitrogen pressure is removed. The temperature is maintained at 100° C. for an additional 2 hours and 40 minutes allowing steam stripping.

The copolymer so formed is partially insoluble in methyl ethyl ketone and for this reason, no viscosity could be obtained.

Examples 1–22 clearly show the advantages obtained by employing steam stripping and anti-foaming agents in suspension polymerization procedures. Thus, lower viscosity, low molecular weight uniform copolymers are obtained employing the principles of our invention.

While certain specific embodiments of this invention have been described for purposes of illustration, it is obvious that the invention is not limited thereto and that many modifications fall within the scope of the disclosure and claims.

We claim:

1. An aqueous suspension polymerization process for producing a monovinyl aryl-acrylonitrile polymer comprising:
    polymerizing a monomer mixture maintained in aqueous suspension, the monomer mixture comprising about 20 to 35% by weight of acrylonitrile and about 65 to 80% by weight of at least one monovinyl aromatic compound;
    carrying out the polymerization of said monomer mixture in suspension without substantial removal of monomer until a conversion to polymer of from about 40 to 70% has been attained; and
    thereafter continuing the polymerization to substantial completion while steam distilling the polymerization mixture under such temperature and pressure conditions so as to partially remove sufficient acrylonitrile to maintain a substantially constant ratio between the polymerizing monomers, thereby providing a substantially uniform, low viscosity monovinyl aryl-acrylonitrile polymer.
2. A process of claim 1 wherein styrene is employed as the monovinyl aromatic compound.
3. A process of claim 1 wherein the monomer mixture comprises about 20 to 35% acrylonitrile, about 5 to 35% alpha-methylstyrene, and about 30 to 75% of styrene, based on the weight of the monomer mixture.
4. A process of claim 1 wherein the catalyst employed is an aliphatic peroxide having the following formula:

$$CH_3(CH_2)_nCO_2O_2$$

wherein $n$ is an integer from 6 to 16.

5. A process of claim 1 wherein the pH of the aqueous medium is adjusted to a pH within the range of pH 2.5 to pH 4.5.
6. The process of claim 1 wherein the steam distillation is effected by raising the temperature of the polymerizing mixture in approximately equal increments to about 100° C. at substantially atmospheric pressure during the course of the distillation step.
7. A process of claim 2 wherein an acid having an ionization constant of less than $1 \times 10^{-4}$ is present in the polymerization mixture in an amount sufficient to adjust the aqueous medium employed to a pH within the range of pH 2.5 to pH 4.5.
8. A process of claim 7 wherein the acid employed is acetic acid.
9. A process of claim 7 wherein the acid employed is pimelic acid.

References Cited

UNITED STATES PATENTS

| | | | |
|---|---|---|---|
| 2,846,424 | 11/1955 | Mino | 260—25.5 |
| 2,822,356 | 2/1958 | Crane | 260—93.5 |
| 2,851,446 | 9/1958 | Wesp et al. | 260—85.5 |
| 3,040,008 | 6/1962 | Wishman et al. | 260—80.5 |

OTHER REFERENCES

The Chemistry of Acrylonitrile, 2nd, American Cyanamid Company, New York, 1959 (pages 32–36).

JOSEPH L. SCHOFER, *Primary Examiner.*

W. HOOVER, *Assistant Examiner.*